(No Model.)

T. SHARTS.
CONCRETE ILLUMINATING TILE.

No. 432,249. Patented July 15, 1890.

WITNESSES:
Gustave Dieterich
Ortug Dieterich

INVENTOR
Theodore Sharts

UNITED STATES PATENT OFFICE.

THEODORE SHARTS, OF NEW YORK, N. Y.

CONCRETE ILLUMINATING-TILE.

SPECIFICATION forming part of Letters Patent No. 432,249, dated July 15, 1890.

Application filed February 21, 1890. Serial No. 341,356. (No model.)

*To all whom it may concern:*

Be it known that I, THEODORE SHARTS, of the city, county, and State of New York, have invented certain new and useful Improvements in Concrete Illuminating-Tiles for Sidewalks, Areas, Stoops, Floor-Lights, Roof-Lights, &c.; and I do hereby declare that the following is a full, clear, and exact description thereof, reference being had to the accompanying drawings, making part of this specification, in which—

Figure 1:
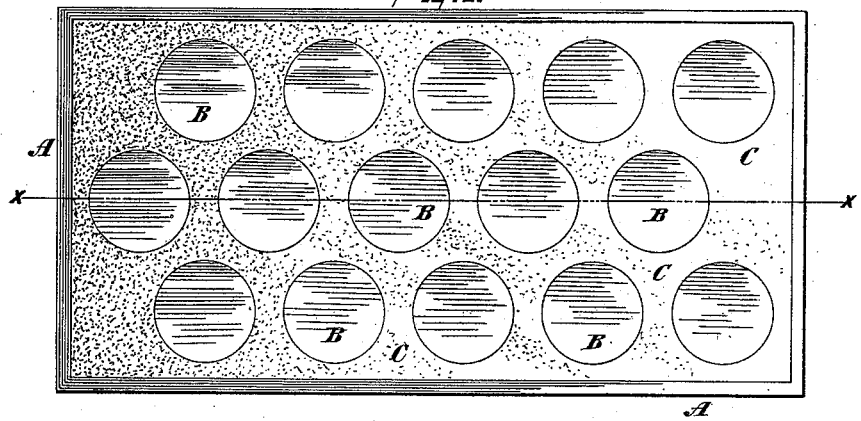
Figure 2:
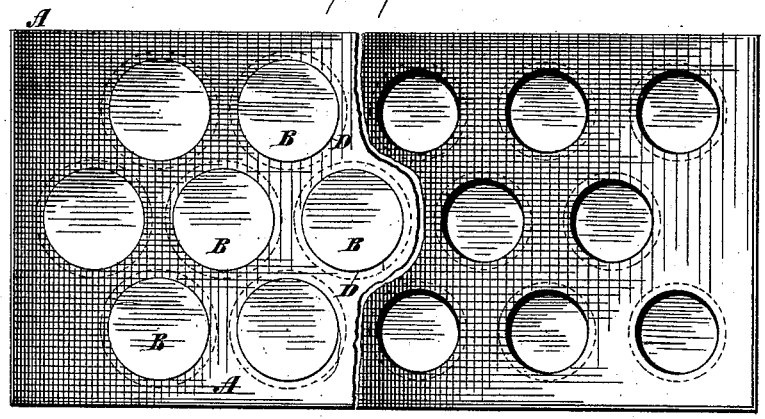
Figure 3:
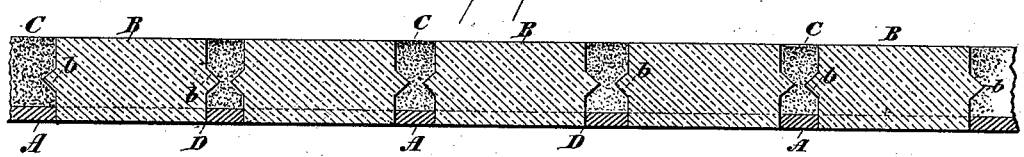
Figure 4:
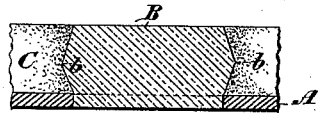
Figure 5:
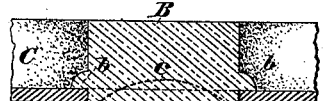
Figure 6:
Figure 7:
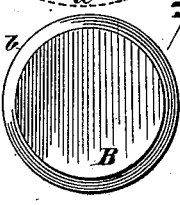

Figure 1 is a plan view of my illuminating-tile. Fig. 2 is an inverted plan or bottom view of a tile, showing the difference in the size of the light-openings. Fig. 3 is a longitudinal vertical section on the line X X of Fig. 1. Figs. 4, 5, and 6 are detail sectional views of modifications of glass lenses. Fig. 7 is a plan view of one of the lenses detached.

A designates the bed-plate or grating.

B designates the glass lenses; C, the concrete filling; D, the light-openings in bedplate.

$b$ $b$ designate the supporting-rim of the lenses.

$c$ in Fig. 5 designates in dotted lines a concave lens.

$d$ in Fig. 5 designates in dotted lines a convex lens.

The construction of my concrete illuminating-tile consists of a cast-iron grating or bedplate, through which are light-openings for the reception of glass lenses, the glass lenses being set in position over the light-openings. The plastic cement or concrete is placed upon the bed-plate and surrounds the glass lenses flush with their top surfaces, this cement filling with the glass lenses forming the stepping-surface of the tile.

My invention relates to concrete illuminating-tiles which have their light-openings through the grating or bed-plate equal in area and diameter to the area and diameter of the top surface of the glass lenses, the glass lenses being equal in diameter at top and bottom and flush with the surface of the bed-plate or protruding into the light-openings of the same. These lenses are made with irregular sides, so that the concrete or cement filling when in a plastic state will conform to these irregular sides of the lenses, so that when the plastic cement filling becomes hardened it forms an ample and sufficient bearing for the glass lenses, obviating the necessity of any part of the lenses resting directly upon the grating. The glass lenses being equal in diameter and area at both top and bottom surfaces, the bottom protruding through the light-openings of the grating allows the same quantity of light to pass through the light-openings of the gratings as enters the top surface of the lenses, there being no obstruction whatever to the passage of light through the lenses from top to bottom.

The universal method heretofore in use by all manufacturers of vault-lights was the employment of an annular ledge or bearing around the light-openings of the grating from one-eighth to three-sixteenths of an inch wide, upon which the glass lenses have their bearing, consequently reducing the area of light-openings at the bottom of the lenses to a greater or less extent and greatly obstructing the passage of the light through the gratings, the top surfaces of the lenses being greater in diameter than the light-openings through the gratings.

By my device of making the light-openings through the gratings equal in diameter and area to the top surface of the lenses and allowing the lenses to protrude through the grating or bed-plate I gain about twenty-five per cent. more light through a two-inch lens than can be obtained through the old style of tiles, where the lenses rest upon an annular bearing on the grating, as above described.

The lenses of my improved tile may have an annular collar running around them to form a bearing on the bed-plate, if desired, or they may be made with the sides beveling outward from the bottom, the iron grating made with a corresponding bevel to fit the glass lenses, thus forming a bearing for the lenses in connection with the concrete filling on the bed-plate conforming to the same bevel sides of the lenses; but I prefer either to have a collar around the lenses, about midway between the top surface of the lenses and the bed-plate, as shown in Fig. 3, letter $b$, or a lens with bevel sides, as shown in Fig. 4, letter $b$, protruding out into the concrete filling, so that when the plastic filling becomes hardened it will form an ample and sufficient bearing for the lenses and obviate entirely the necessity of any direct bearing of the lenses upon the grating. The sides of these lenses may be made of any irregular shape sufficient to allow the plastic cement filling to adjust itself firmly around the lenses for the purpose above stated.

The wearing-surface of my illuminating-tile is composed of the concrete filling flush with the surface of the glass lenses. I do not claim this as part of my invention at this time, as it was covered by a patent granted to me April 22, 1873; nor do I claim any particular shape for the irregular sides of the glass lenses.

My invention consists in the following elements: First, the equal area and diameter through the light-openings of the gratings with the top surface of the lenses; second, the lenses being of equal diameter and area both on the top and bottom surfaces; third, the lenses extending through the grating or even below if required, and, fourth, the lenses having irregular sides, which, being embedded in the concrete filling, require no other bearing than the concrete filling itself. The glass lenses thus being firmly embedded in the concrete filling and the concrete filling resting compactly upon every portion of the bed-plate around the light-openings, the whole forms a solid and substantial structure suitable for the purpose for which it is required.

By the use of my invention an important desideratum is accomplished, an increase of twenty-five per cent. of the volume of light passing through the lenses and light-openings of the gratings, supposing the lenses to be two inches in diameter, a matter of great benefit and economy to users of vault-lights.

As the devices I have herein described may be practically available to other styles of illuminating-tiles, I do not confine myself to the concrete tiles only.

Having thus described my invention, what I claim as new, and desire to secure by Letters Patent, is—

An illuminating-tile composed of a plate perforated for light-openings, lenses set therein, each lens being of cylindrical form with a V-shaped projection encircling its central portion and embedded in the cement filling, thereby interlocking the parts, substantially as set forth.

THEODORE SHARTS.

Witnesses:
G. W. GOODWIN,
WM. B. DAVIS.